United States Patent
Tamura

(10) Patent No.: US 6,840,035 B2
(45) Date of Patent: Jan. 11, 2005

(54) EXHAUST EMISSION CONTROL SYSTEM FOR MULTIPLE CYLINDER INTERNAL COMBUSTION ENGINE

(75) Inventor: Yasuki Tamura, Nisshin (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/374,108

(22) Filed: Feb. 27, 2003

(65) Prior Publication Data

US 2003/0159433 A1 Aug. 28, 2003

(30) Foreign Application Priority Data

Feb. 28, 2002 (JP) ........................................ 2002-054552

(51) Int. Cl.$^7$ ................................................ F01N 3/00
(52) U.S. Cl. ........................................ 60/277; 60/285
(58) Field of Search .................... 60/285, 277, 276; 123/692, 690, 691

(56) References Cited

U.S. PATENT DOCUMENTS

| | | | | |
|---|---|---|---|---|
| 5,233,829 A | * | 8/1993 | Komatsu | 60/276 |
| 5,247,793 A | * | 9/1993 | Yamada et al. | 60/276 |
| 5,385,016 A | * | 1/1995 | Zimlich et al. | 60/274 |
| 5,894,727 A | * | 4/1999 | Zimlich | 60/274 |
| 6,151,889 A | * | 11/2000 | Davey et al. | 60/274 |
| 6,463,735 B2 | * | 10/2002 | Morinaga et al. | 60/277 |
| 6,467,254 B1 | * | 10/2002 | Cullen et al. | 60/274 |

* cited by examiner

Primary Examiner—Thomas Denion
Assistant Examiner—Diem Tran
(74) Attorney, Agent, or Firm—Birch, Stewart, Kolasch & Birch, LLP

(57) ABSTRACT

An exhaust emission control system for an internal combustion engine includes an exhaust air-fuel ratio changing device switching the exhaust air-fuel ratio of exhaust gas flowing into one of an upstream exhaust passages and the exhaust air-fuel ratio of exhaust gas flowing into the other one of the upstream exhaust passages to a rich air-fuel ratio and to a lean air-fuel ratio alternately on a predetermined cycle longer than each of combustion cycles of the internal combustion engine, to thereby determine whether upstream catalytic converters have deteriorated or not according to a change in the exhaust air-fuel ratio outputted by upstream exhaust sensors provided downstream of the upstream catalytic converters. Therefore, it is possible to surely determine whether catalytic converters have deteriorated even slightly or not while ensuring a high exhaust emission control performance.

7 Claims, 5 Drawing Sheets

EXHAUST EMISSION CONTROL SYSTEM FOR MULTIPLE CYLINDER INTERNAL COMBUSTION ENGINE

CROSS-REFERENCE TO THE RELATED APPLICATION

This application incorporates by reference the subject matter of Application No. 2002-54552 filed in Japan on Feb. 28, 2002, on which a priority claim is based on under 35 U.S.C. § 119(a).

BACKGROUND OF THE INVENTION (1) Field of the Invention

The present invention relates to an exhaust emission control system for a multiple cylinder internal combustion engine. In particular, the present invention relates to the technique for determining whether a catalytic converter has deteriorated or not.

(2) Description of the Related Art

Conventionally, considering that the oxygen storage capacity of a catalyst in a catalytic converter for exhaust emission control is correlated closely with the catalyst performance (mainly the HC purifying performance), whether the catalytic converter containing a large amount of oxygen occluding substances such as cerium (Ce) has deteriorated or not is determined by monitoring a change in the oxygen storage performance with passage of time.

This catalyst deterioration detection method utilizes such a characteristic that, in the case where the air-fuel ratio of an exhaust gas flowing into the catalytic converter is modulated between a lean air-fuel ratio and a rich air-fuel ratio at a predetermined cycle with a predetermined amplitude, if the oxygen storage capacity is high, the response or amplitude of the air-fuel ratio of the exhaust gas downstream of the catalyst is relatively slow or small since the oxygen is occluded by the catalytic converter, and if the oxygen storage capacity is low, the response or amplitude of the air-fuel ratio of the exhaust gas downstream of the catalyst is relatively quick or large since the oxygen is emitted without being not so much occluded by the catalytic converter. For example, the variation cycle, amplitude, or the like of the oxygen concentration detected and outputted from an oxygen sensor ($O_2$ sensor) or an air-fuel ratio sensor (LAFS) provided downstream of the catalyst is detected, and if the detected variation cycle, amplitude, or the like is equal to or greater than a predetermined reference value, it is then determined that the oxygen storage capacity has lowered, i.e. the catalytic converter has deteriorated.

Incidentally, in recent years, the exhaust emission control performance has been desired to be further improved in view of environmental protection, and accordingly, even a slight deterioration of a catalytic converter has been required to be detected.

According to the above-described conventional catalyst deterioration detecting method, however, the modulation cycle is set to a relatively short cycle due to the relation with the operational performance of the internal combustion engine. Since only a small amount of oxygen can be occluded on such a short modulation cycle and there is only a slight variation in the output value of the oxygen concentration, it is difficult to detect a slight deterioration of the catalyst. Namely, although it is possible to detect a deterioration of the catalyst to a certain extent, it is difficult to detect a slight deterioration of the catalyst.

To address this problem, it may be possible to consider increasing the modulation cycle. The increase in the modulation cycle causes oxygen to be occluded to such an extent as to exceed the oxygen storage capacity, and it is therefore possible to surely detect a change with elapse of time in modulation cycle, amplitude, or the like of the output value of the oxygen concentration and to detect even a slight deterioration of the catalyst. In this case, however, there is the problem that the $NO_x$ purifying performance is deteriorated.

FIG. 5 is a graph showing the relationship between the $NO_x$ emission and the modulation frequency in the case where a middle air-fuel ratio is changed when the exhaust air-fuel ratio is modulated. In FIG. 5, "o" indicates the shortest cycle (highest frequency), and the frequency is increased in the order of "□," "Δ," and "▲," and "■" indicates the longest cycle (the lowest frequency). When the cycle is increased (the frequency is lowered), the $NO_x$ emission is reduced if the middle air-fuel ratio is modulated to a leaner air-fuel ratio, but the $NO_x$ emission is increased if the middle air-fuel ratio is modulated to a richer air-fuel ratio.

Further, although not shown in FIG. 5, increasing the cycle (lowering the frequency) may cause an increase in the $NO_x$ emission irrespective of the middle air-fuel ratio.

It is therefore an object of the present invention to provide an exhaust emission control system for an internal combustion engine capable of surely determining whether or not catalytic converters have deteriorated even slightly while ensuring a high exhaust emission control performance.

SUMMARY OF THE INVENTION

To attain the above object, the present invention provides an exhaust emission control system for an internal combustion engine, comprising a plurality of upstream exhaust passages provided for respective ones of a plurality of cylinders of the internal combustion engine, a downstream exhaust passage formed by joining the plurality of upstream exhaust passages, a plurality of upstream catalytic converters disposed in respective ones of the plurality of upstream exhaust passages, a downstream catalytic converter disposed in the downstream exhaust passage, upstream exhaust sensor provided in the upstream exhaust passages and positioned downstream of the upstream catalytic converters to detect an exhaust air fuel ratio, an exhaust air-fuel ratio changing device that switches an exhaust air-fuel ratio of exhaust gas flowing into one of the plurality of upstream exhaust passages and an exhaust air-fuel ratio of exhaust gas flowing into the other one of the plurality of upstream exhaust passages to a rich air-fuel ratio and to a lean air-fuel ratio alternately at a predetermined cycle longer than each of combustion cycles of the internal combustion engine, and a deterioration determination device that determines whether the upstream catalytic converters have deteriorated according to a change in the exhaust air-fuel ratio detected by the upstream exhaust sensor.

With the above arrangement, according to one embodiment of the present invention, the exhaust air-fuel ratio changing device makes uniform the combustion air-fuel ratio of the respective cylinders of the cylinder group in one of the plurality of upstream exhaust passages, makes uniform the combustion air-fuel ratio of the respective cylinders of the cylinder group in the other one of the plurality of upstream exhaust passages, and switches the exhaust air-fuel ratio of exhaust gas flowing into one upstream exhaust passage and the exhaust air-fuel ratio of exhaust gas flowing into the other upstream exhaust passage to a rich air-fuel ratio and to a lean air-fuel ratio alternately on a long cycle. Therefore, it is possible to detect even a slight deterioration of the upstream catalytic converters by surely detecting a change with elapse of time in the exhaust air-fuel ratio detected and outputted by the upstream exhaust sensors, because the air-fuel ratio is modulated to a rich air-fuel ratio and to a lean air-fuel ratio on a long cycle to cause a sufficient amount of oxygen to be occluded.

On the other hand, although $NO_x$ may not be purified if the modulation cycle is long, $NO_x$ that has not been purified by the upstream catalytic converters can be surely purified by the downstream catalytic converter because exhaust gas from the cylinder group in one upstream exhaust passage and exhaust gas from the cylinder group in the other upstream exhaust passage alternately flow into the downstream catalytic converter to modulate the exhaust air-fuel ratio to a rich air-fuel ratio and to a lean air-fuel ratio on a short cycle.

As a result, it is possible to determine whether the catalytic converters have deteriorated even slightly or not while ensuring a high exhaust emission control performance.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DESCRIPTION OF THE PREFERRED EMBODIMENT

The present invention will now be described in detail with reference to the drawings showing an embodiment thereof.

Figure 1:
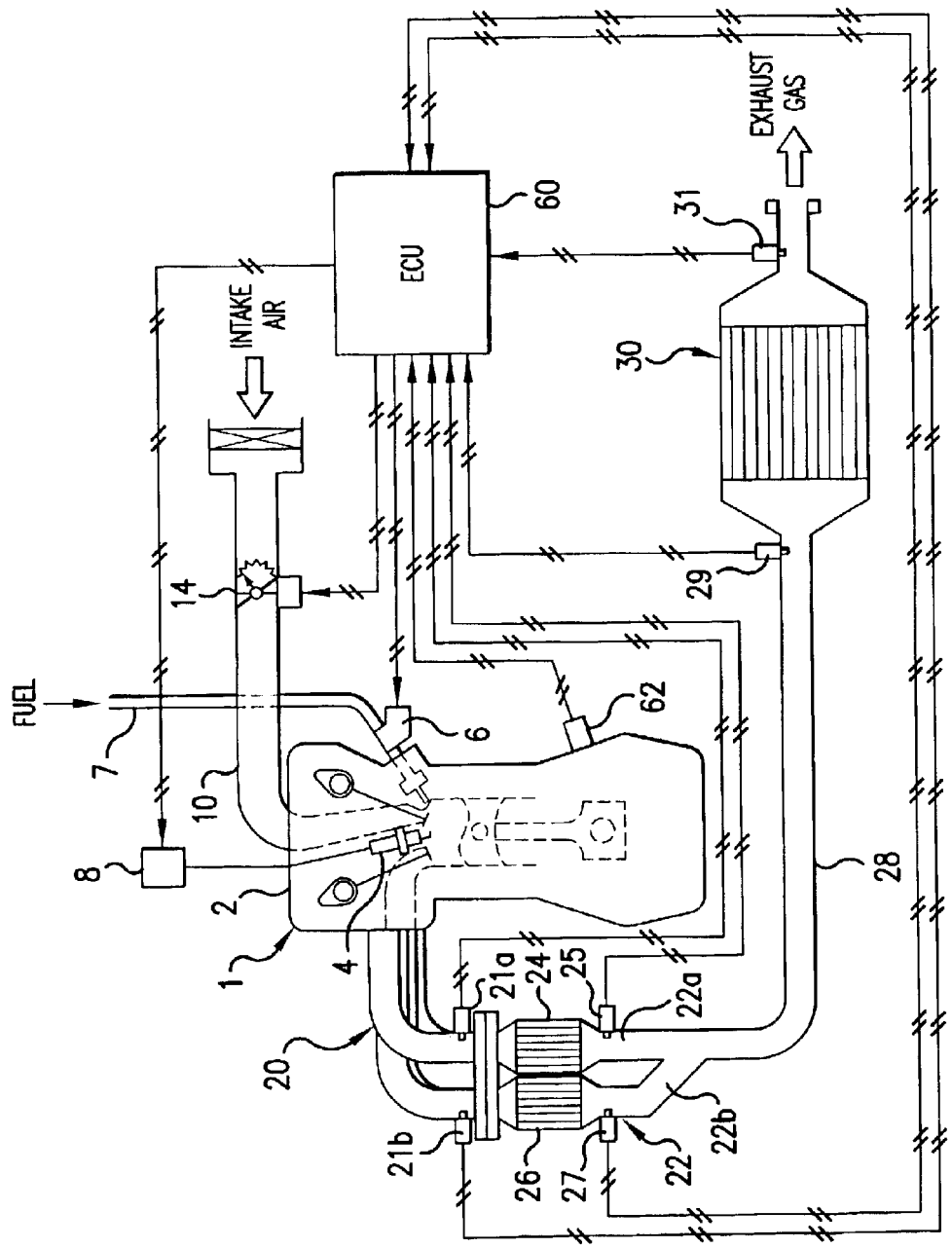
FIG. 1 is a schematic view showing a structure of an exhaust emission control system for a multiple cylinder internal combustion engine according to an embodiment of the present invention.

FIG. 1 is a schematic diagram showing the construction of an exhaust emission control system for a multiple cylinder internal combustion engine according to the embodiment of the present invention. A description will now be given of the construction of the exhaust emission control system with reference to FIG. 1.

As shown in FIG. 1, a cylinder injection type spark ignition 4-cycle 4-cylinder gasoline engine capable of performing fuel injection in an intake stroke (intake stroke injection) and in a compression stroke (compression stroke injection) by switching the fuel injection mode, for example, is employed as an engine main body (hereinafter referred to as "engine") 1 as a multiple cylinder internal combustion engine. The cylinder injection type engine 1 is capable of operating at a stoichiometric air-fuel ratio, a rich air-fuel ratio (rich air-fuel ratio operation), and a lean air-fuel ratio (lean air-fuel ratio operation).

As shown in FIG. 1, an ignition plug 4 and an electromagnetic type fuel injection valve 6 are attached to a cylinder head 2 of each cylinder of the engine 1 such that fuel can be injected directly into a combustion chamber.

An ignition coil 8, which outputs a high voltage, is connected to the ignition plug 4. A fuel supply device, not shown, including a fuel tank is connected to the fuel injection valve 6 via a fuel pipe 7. In further detail, the fuel supply device is provided with a low-pressure fuel pump and a high-pressure fuel pump to supply fuel stored in the fuel tank to the fuel injection valve 6 at a low fuel pressure or a high fuel pressure, and injecting the fuel from the fuel injection valve 6 into the combustion chamber at a desired fuel pressure.

The cylinder head 2 of each cylinder is formed with an intake port in a substantially vertical direction, and one end of an intake manifold 10 is connected to each intake port such that it is in communication with each intake port. The intake manifold 10 is provided with an electromagnetic type throttle valve 14 that controls the intake air volume.

Figure 2:
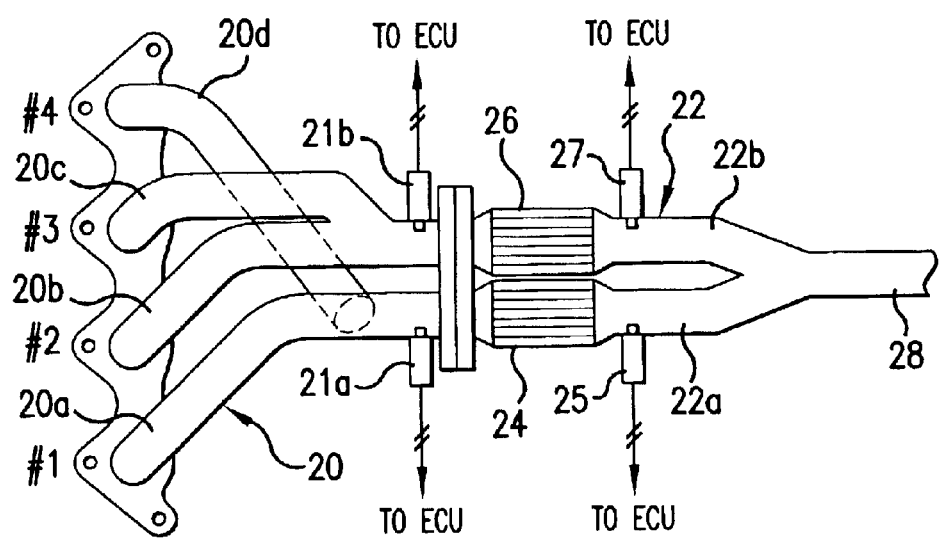
FIG. 2 is a view showing a dual type exhaust manifold system.

The cylinder head 2 of each cylinder is formed with an exhaust port in a substantially horizontal direction, and one end of an exhaust manifold 20 is connected to each exhaust port such that it is in communication with each exhaust port. In this example, a dual type exhaust manifold system as shown in FIG. 2 is used as the exhaust manifold 20.

The dual type exhaust manifold system, as the exhaust manifold 20, is constructed such that an exhaust passage 20a extending from a #1 cylinder and an exhaust passage 20d extending from a #4 cylinder are joined and an exhaust passage 20b extending from a #2 cylinder and an exhaust passage 20c extending from #3 cylinder are joined (in the case where the order of combustion is #1→#3→#4→#2). Specifically, the #1 cylinder and the #4 cylinder where combustion is not continuous are joined as one cylinder group (#1, #4 cylinder group), and the #2 cylinder and the #3 cylinder where combustion is not continuous are joined as one cylinder group (#2, #3 cylinder group). This reduces exhaust gas interference in the exhaust manifold 20, and achieves a large exhaust inertia or pulsating effect.

An exhaust pipe (downstream exhaust passage) 28 is connected to the other end of the exhaust manifold 20 via a collecting pipe (upstream exhaust passage) 22. The collecting pipe 22 is comprised of two pipe lines (dual pipe lines): a collecting pipe (one upstream exhaust passage) 22 in which exhaust gas. from the exhaust passages 20a and 20d flow and a collecting pipe (the other upstream exhaust passage) 22b in which exhaust gases from the exhaust passages 20b and 20c flow. Specifically, the collecting pipe 22 is constructed such that exhaust gases from one cylinder group consisting of the #1 cylinder and the #4 cylinder flow in the collecting pipe 22a and exhaust gases from the other cylinder group consisting of the #2 cylinder and the #3 cylinder flow in the collecting pipe 22b.

A three-way catalyst (which is an upstream catalytic converter and a manifold catalyzer converter, and is hereinafter referred to as "#1, #4 MCC" or "MCC") 24 including oxygen occluding substances such as cerium (Ce) serving as an upstream catalytic converter corresponding to the #1, #4 cylinder group is placed in the collecting pipe 22a. Likewise, a three-way catalyst (which is an upstream catalytic converter and a manifold catalyzer converter, and is hereinafter referred to as "#2, #3 MCC" or "MCC") 26 including oxygen occluding substances such as cerium (Ce) serving as an upstream catalytic converter corresponding to the #2, #3 cylinder group is placed in the collecting pipe 22b. Since the MCC 24 and the MCC 26 are placed in the collecting pipes 22a and 22b, respectively, at positions close to the engine 1, the MCC 24 and the MCC 26 can be promptly activated even when the engine 1 is cold. Therefore, it is possible to purify harmful substances (HC, CO, and $NO_x$) in exhaust gases irrespective of the operating state of the engine 1.

Air-fuel ratio sensors (such as LAFS or $O_2$ sensor, hereinafter referred to as "front A/F sensors") 21a and 21b, which detect the exhaust air-fuel ratio (exhaust A/F) are respectively provided upstream of the #1, #4 MCC 24 (a part where the exhaust passage 20a and the exhaust passage 20d of the exhaust manifold 20 join) and upstream of the #2, #3 MCC 26 (a part where the exhaust passage 20b and the exhaust passage 20c of the exhaust manifold 20 join).

Similarly, air-fuel ratio sensors (which are upstream exhaust sensors and are hereinafter referred to as "middle A/F sensors") 25 and 27 are respectively provided downstream of the #1, #4 MCC 24 in the collecting pipe 22a and downstream of the #2, #3 MCC 26 in the collecting pipe 22b.

A three-way catalyst (which is a downstream catalytic converter and an under floor catalyzer converter, and is hereinafter referred to as "UCC") 30 is also placed in the exhaust pipe 28. The UCC 30 also includes oxygen occluding substances such as cerium (Ce).

An air-fuel ratio sensor (hereinafter referred to as "upstream rear A/F sensor") 29 is provided upstream of the UCC 30 in the exhaust pipe 28, and an air-fuel ratio sensor (which is a downstream exhaust sensor, and is hereinafter referred to as "downstream rear A/F sensor") 31 is provided downstream of the UCC 30.

An electronic control unit (ECU) 60 is comprised of an input/output device, a storage device (a RCM, a RAM, or a nonvolatile RAM), a central processing unit (CPU), a timer counter, and so forth. The ECU 60 controls the overall operations of the exhaust emission control system including the engine 1.

A variety of sensors such as a crank angle sensor 62 as well as the above-mentioned front A/F sensors 21a and 21b, middle A/F sensors 25 and 27, upstream rear A/F sensor 29, and downstream rear A/F sensor 31 are connected to the input side of the ECU 60 so that information detected by these sensors can be inputted to the ECU 60. It should be noted that the engine speed Ne is obtained by determining the present combustion cylinder based on the crank angle detected by the crank angle sensor 62.

On the other hand, a variety of output devices such as the above-mentioned fuel injection valve 6, ignition coil 8, and throttle vale 14 are connected to the output side of the ECU 60. If, for example, the air-fuel ratio (combustion A/F) has been set in the order of combustion (#1→#3→#4→#2) according to the detected information from the A/F sensors, command signals representing the fuel injection quantity and the fuel injection timing are outputted to the fuel injection valve 6 in the order of combustion according to the combustion A/F, and command signals representing the ignition timing is outputted to the ignition coil 8 in the order of combustion. Therefore, a proper quantity of fuel can be injected from the fuel injection valve 6 at proper timing, the throttle valve 14 is opened at a proper angle, and the ignition plug performs spark ignition at proper timing.

A description will now be given of the operation of the multiple injection internal combustion engine according to the present invention constructed as described above, that is, the method for determining whether the catalyst has deteriorated or not according to the present invention.

According to the present invention, whether the catalytic converter has deteriorated or not is basically determined by monitoring a change in the oxygen storage capacity of the catalytic converter with elapse of time when the A/F of exhaust gas flowing into the catalytic converter is modulated between a lean air fuel ratio and a rich air fuel ratio. The combustion A/F in the #1, #4 cylinder group and the combustion A/F in the #2, #3 cylinder group are switched to a lean air-fuel ratio or to a rich air-fuel ratio at regular intervals, and the exhaust A/F in the #1, #4 cylinder group and the exhaust A/F in the #2, #3 cylinder group are switched to a lean air-fuel ratio or to a rich air-fuel ratio.

Specifically, fuel is supplied into the #1 cylinder and the #4 cylinder such that the combustion A/F is equal in the #1 cylinder and the #4 cylinder and the combustion A/F is equal in the #2 cylinder and the #3 cylinder, and the quantity of fuel supplied to the #1 cylinder and the #4 cylinder and the quantity of fuel supplied to the #2 cylinder and the #3 cylinder are increased or decreased at regular intervals, e.g. at a predetermined cycle.

Figure 3:
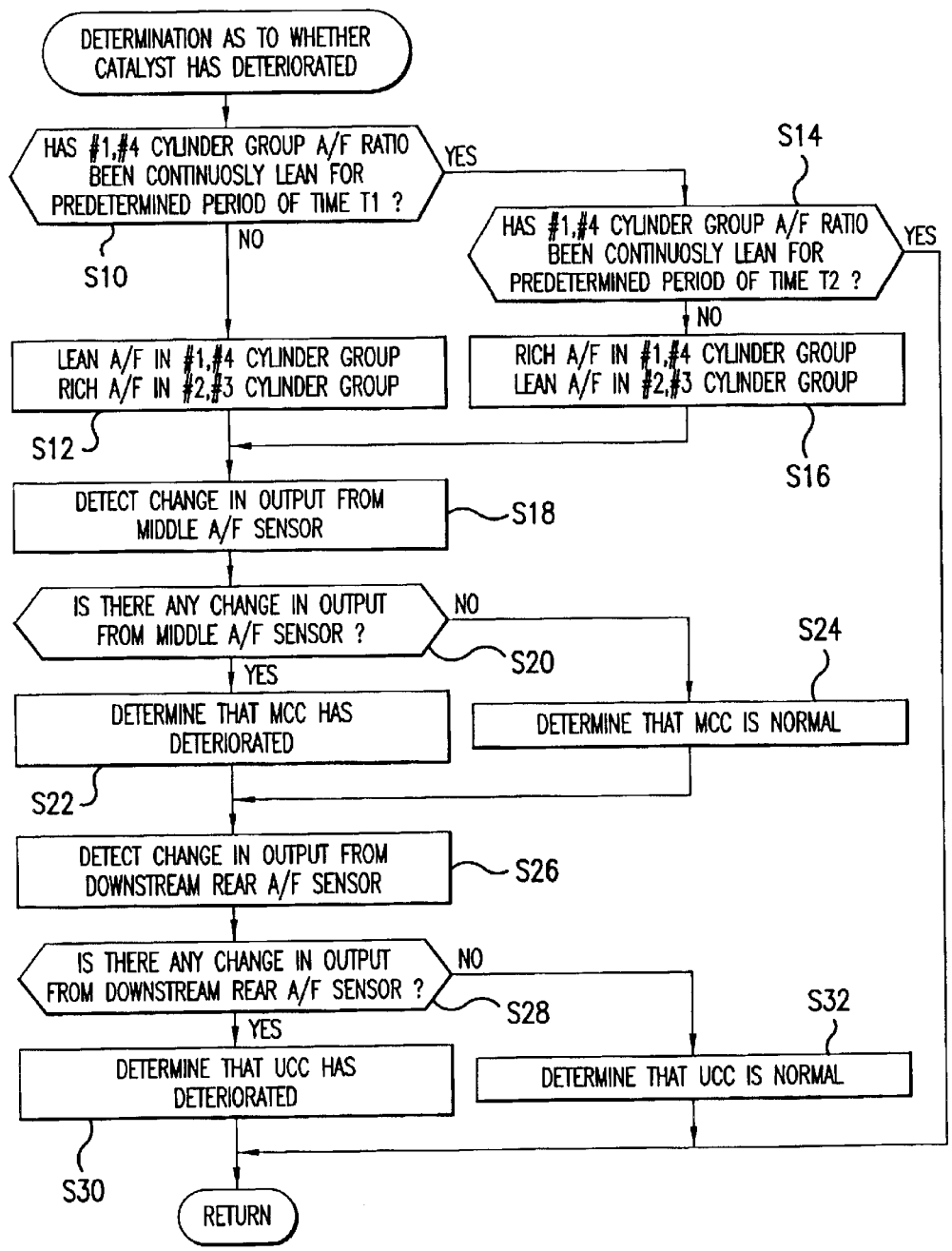
FIG. 3 is a flow chart showing a control routine for determining whether a catalyst has deteriorated or not according to the embodiment of the present invention.

FIG. 3 is a flow chart showing a control routine for determining whether the catalyst has deteriorated or not according to the present invention. With reference to FIG. 3, a detailed description will now be given of the procedure for determining whether the catalyst has deteriorated or not according to the present invention.

Upon start of the control routine for determining whether the catalyst has deteriorated or not, it is determined first in Step S10 whether or not a period of time that the combustion A/F (or the exhaust A/F) in the #1, #4 cylinder group has been continuously lean is equal to or longer than a predetermined period of time T1 or not. The predetermined period of time T1 is a value obtained from a map (e.g. about 2–6 sec.) calculated and stored in advance according to the operating conditions of the engine (the engine speed Ne, the volume efficiency, the catalytic temperature, and so forth). This predetermined period of time T1, however, may be a fixed value. The predetermined period of time T1 may be any value insofar as it is longer than one cycle, and more preferably, the predetermined period of time T1 is set according to the oxygen storage capacity of the #1, #4 MCC 24 so that it can be longer than a period of time elapsed until the amount of oxygen occluded by the #1, #4 MCC 24 exceeds the oxygen storage capacity, that is, a period of time elapsed until the modulation of the exhaust A/F is detected by the middle A/F sensor 25. In this case, it is preferred that the predetermined period of time T1 is corrected according to the operating conditions of the engine 1 (the engine speed Ne, volume efficiency, catalytic temperature, exhaust temperature, illustrated middle effective pressure, net middle effective pressure, intake manifold pressure, cooling water temperature, whether or not a predetermined period of time has passed or not after cold-starting, and the degree of catalyst deterioration (mileage, etc.)).

Further, although in this example, the predetermined period of time T1 is specified by time, the present invention is not limited to this, but may be specified by the number of cycles of the engine 1. For example, the predetermined period of time T1 may be set to 150 cycles.

If the determination result is false (No) in Step S10, i.e. if it is determined that the period of time that the combustion A/F of the #1, #4 cylinder group has been lean is shorter than the predetermined period of time T1, the process proceeds to Step S12 wherein the combustion A/F of the #1, #4 cylinder group is modulated to a leaner air-fuel ratio and the combustion A/F of the #2, #3 cylinder group is modulated to a richer air-fuel ratio.

If the determination result is true (Yes) in Step S10, i.e. if it is determined that the period of time that the combustion A/F of the #1, #4 cylinder group has been lean is equal to or longer than the predetermined period of time T1, the process proceeds to Step S14 wherein it is determined whether or not the combustion A/F of the #2, #3 cylinder group has been continuously lean for a period of time equal to or longer than a predetermined period of time T2 or not. As is the case with the predetermined period of time T1, the predetermined period of time T2 is a value obtained from a map (e.g. about 2–6 sec.) calculated and stored in advance according to the operating conditions of the engine (the engine speed Ne, the volume efficiency, the catalytic temperature, and so forth). The predetermined period of time T2, however, may be a fixed value. The predetermined period of time T1 may also be any value insofar as it is longer than one cycle, and more preferably, the predetermined period of time T1 is set according to the oxygen storage capacity of the #2, #3 MCC 26 so that it can be longer than a period of time elapsed until the amount of oxygen occluded by the #2, #3 MCC 26 exceeds the oxygen storage capacity, that is, a period of time elapsed until the modulation of the exhaust A/F is detected by the middle A/F sensor 27. In this case, it is preferred that the predetermined period of time T1 is corrected according to the operating conditions of the engine 1 (the engine speed Ne, volume efficiency, catalytic temperature, exhaust temperature, indicated average effective pressure, net average effective pressure, intake manifold pressure, cooling water temperature, whether or not a predetermined period of time has passed or not after cold-starting, and the degree of catalyst deterioration (mileage, etc.)) so that the exhaust emission control performance of the #2, #3 MCC 26 can be optimum or a deterioration of the #2, #3 MCC 26 can be easily detected.

Although in this example, the predetermined period of time T2 is set to the same value as the predetermined period of time T1, the present invention is not limited to this, but the predetermined period of time T2 and the predetermined period of time T1 may be different. The predetermined period of time T2 may be specified by the number of cycles of the engine 1 as mentioned above, and may be set to 150 cycles, for example.

If the determination result is false (No) in Step S14, i.e. if it is determined that the period of time that the combustion A/F of the #2, #3 cylinder group has been lean is shorter than the predetermined period of time T2, the process proceeds to Step S16 wherein the combustion A/F of the #1, #4 cylinder group is modulated to a richer air-fuel ratio and the combustion A/F of the #2, #3 cylinder group is modulated to a leaner air-fuel ratio. On the other hand, if the determination result is true (Yes) in Step S14, the process returns to Step S10 to make the above described determination again.

Figure 4:
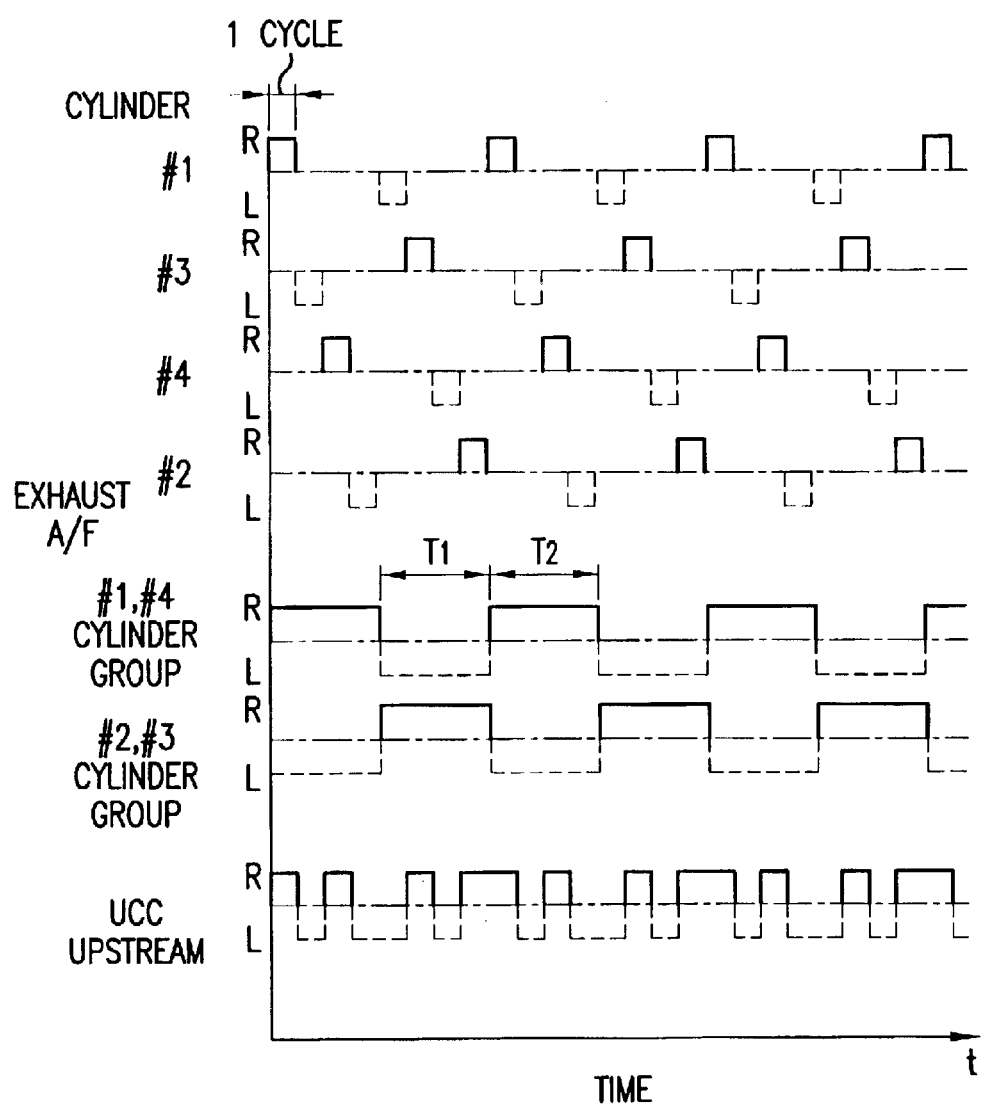
FIG. 4 is a time chart showing the change in the exhaust A/F for each cylinder, the exhaust A/F for each cylinder group, and the exhaust A/F upstream of a UCC with elapse of time in the case where the control routine for determining whether the catalyst has deteriorated or not is executed.
Figure 5:
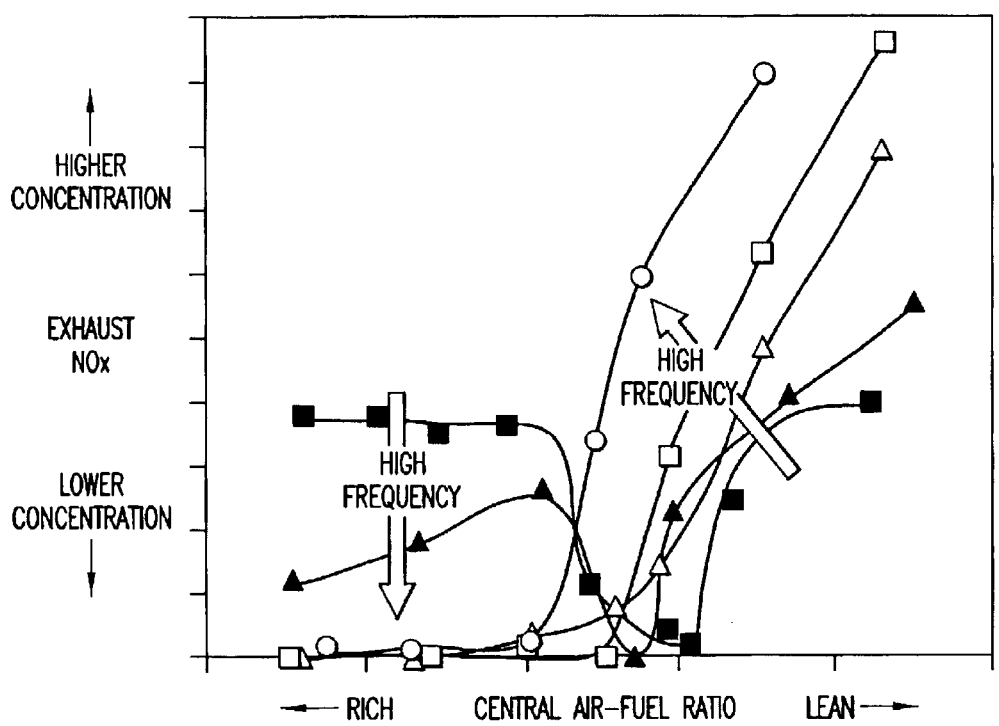
FIG. 5 is a graph showing the relationship between the exhaust $NO_x$ and the modulation frequency in the case where the central air-fuel ratio is changed when the exhaust air-fuel ratio is modulated.

FIG. 4 is a time chart showing a change with elapse of time in the exhaust A/F of each cylinder and the exhaust A/F of each cylinder group in the case where the above described control routine is executed ("R" and solid lines indicate richer air-fuel ratios, and "L" and broken lines indicate leaner air-fuel ratios). In this example, as shown in FIG. 4, the exhaust A/F of the #1, #4 cylinder group is modulated to a leaner A/F and the exhaust A/F of the #2, #3 cylinder group is modulated to a richer A/F for the predetermined period of time T1 (in this example, four cycles for the convenience's sake), and then, the exhaust A/F of the #1, #4 cylinder group is modulated to a richer A/F and the exhaust A/F of the #2, #3 cylinder group is modulated to a leaner A/F for the predetermined period of time T2 (e.g. four cycles) such that the exhaust A/F of exhaust gas flowing into the #1, #4 MCC 24 and the exhaust A/F of exhaust gas flowing into the #2, #3 MCC 26 are modulated in an alternate manner on a relatively long cycle (T1+T2; 8 cycles in this example) (exhaust air-fuel ratio changing device).

If the exhaust A/F of exhaust gas flowing into the #1, #4 MCC 24 and the exhaust A/F of exhaust gas flowing into the #2, #3 MCC 26 are modulated at a relatively long cycle as described above, the amount of oxygen occluded by the #1, #4 MCC 24 and the #2, #3 MCC 26 at a lean air-fuel ratio exceeds the oxygen storage capacity in the case where the catalyst has deteriorated to such an extent that the catalyst deterioration should be detected, and therefore, the middle A/F sensors 25 and 27 can surely detect the modulation of the exhaust A/F on every occasion. If it is possible to surely detect the modulation of the exhaust A/F, a decrease in the oxygen storage capacity of the #1, #4 MCC 24 and the #2, #3 MCC 26 can be easily detected according to a change in the output from the middle A/F sensors 25 and 27. Therefore, a slight decrease in the oxygen storage capacity of the #1, #4 MCC 24 and the #2, #3 MCC 26, i.e. a slight deterioration of the #1, #4 MCC 24 and the #2, #3 MCC 26 can be surely detected by monitoring a change in the output from the middle A/F sensors 25 and 27.

After the execution of Steps S12 and S16, it is determined in Step S18 whether there is a change in the output from the middle A/F sensors 25 and 27 or not. Specifically, if the oxygen storage capacity has decreased, the amount of oxygen emitted without being occluded is increased or the amount of oxygen quickly reaches the saturation level and the oxygen starts flowing out. Accordingly, a change with elapse of time in amplitude of the oscillation of the output from the middle A/F sensors 25 and 27 or a change with elapse of time in response delay time of the oscillation of the output from the middle A/F sensors 25 and 27 is detected.

In the next Step S20, it is determined whether there is a change with time in the amplitude or response delay time of the oscillation of the output from the middle A/F sensors 25 and 27 or not. Specifically, it is determined whether or not the amplitude becomes a predetermined value or larger due to an increase in the amount of emitted oxygen, or whether or not the response delay time becomes a predetermined time or less to cause the oxygen to flow out at an early stage. If the determination result is true (Yes), i.e. if it is determined that there is a change with time in the amplitude or the response delay time of the oscillation of the output from the middle A/F sensors 25 and 27, the process proceeds to Step S22 wherein it is determined that the #1, #4 MCC 24 or the #2, #3 MCC 26 has deteriorated (deterioration determination device). In more detail, if it is determined that there is a change with elapse of time in the amplitude or response delay time of the oscillation of the output from the middle A/F sensor 25, it is determined that the #1, #4 MCC 24 has deteriorated, and if it is determined that there is a change with elapse of time in the amplitude or response delay time of the oscillation of the output from the middle A/F sensor 27, it is determined that the #2, #3 MCC 26 has deteriorated.

It should be noted that, if the determination is made based on the response delay time, a period of time elapsed until exhaust gas reaches the middle A/F sensors 25 and 27 is subtracted from the response delay time.

On the other hand, if it is determined that there is no change with elapse of time in the amplitude or response delay time of the oscillation of the output from the middle A/F sensors 25 and 27, the process proceeds to Step S24 wherein it is determined that the #1, #4 MCC 24 or the #2, #3 MCC 26 is normally functioning.

Incidentally, if the exhaust A/F of exhaust gas flowing into the #1, #4 MCC 24 or the #2, #3 MCC 26 is modulated at a relatively long cycle, $NO_x$ cannot be sufficiently purified by the #1, #4 MCC 24 or the #2, #3 MCC 26. As shown in FIG. 4 that shows a change with elapse of time in the exhaust A/F upstream of the UCC 30, however, the exhaust A/F is the exhaust A/F of exhaust gas emitted from respective cylinders in an area upstream of the UCC 30 where exhaust gases from the collecting pipe 22a and the collecting pipe 22b join, and thus, the exhaust A/F of exhaust gas flowing into the UCC 30 is modulated at a short cycle. Therefore, $NO_x$ that has not been purified by the #1, #4 MCC 24 or the #2, #3 MCC 26 can be purified by the UCC 30.

Namely, according to the present invention, it is possible to surely determine whether or not the #1, #4 MCC 24 or the #2, #3 MCC 26 has deteriorated even slightly while ensuring a high performance of purifying not only HC and CO but also $NO_x$.

Further, in step S26, it is determined whether there is a change in the output from the downstream rear A/F sensor 31 or not in the same manner as in Step S18. Specifically, a change in amplitude of the oscillation of the output from the downstream rear A/F sensor 31 or a change with time in response delay time of the oscillation of the output from the downward rear A/F sensors 31 is detected.

In the next Step S28, as is the case with Step S20, it is determined whether there is a change with elapse of time in the amplitude or response delay time of the output oscillation of the downward rear A/F sensor 31 or not. If the determination result is true (Yes), i.e. if it is determined that there is a change with elapse of time in the amplitude or response delay time of the output oscillation of the downward rear A/F sensor 31, the process proceeds to Step S30 wherein it is determined that the UCC 30 has deteriorated (deterioration determination device). On the other hand, if it is determined that there is not a change with elapse of time in the amplitude or response delay time of the oscillation of the output from the downward rear A/F sensor 31, the process proceeds to Step S32 wherein it is determined that the UCC 30 has not deteriorated but is normally functioning.

Incidentally, the UCC 30 has the conventional problems since the exhaust A/F of exhaust gas flowing into the UCC 30 is modulated at a short cycle as described above, and thus, the accuracy of deterioration as to whether the UCC 30 has deteriorated or not is lower than the accuracy of determination as to whether the #1, #4 MCC 24 and the #2, #3 MCC 26 have deteriorated or not. However, since the accuracy of determination as to whether the UCC 30 has deteriorated or not is at least on the same level as that of the prior art, the reliability of the exhaust emission control system as a whole can be improved by making the determination as to whether the UCC 30 has deteriorated or not as well as the determination as to whether the #1, #4 MCC 24 and the #2, #3 MCC 26 have deteriorated or not.

It is to be understood, however, that there is no intention to limit the invention to the above-described embodiment, but certain changes and modifications may be possible within the scope of the appended claims.

For example, it is preferred that in the determination as to whether the catalyst has deteriorated or not, the exhaust A/F of exhaust flowing into the #1, #4 MCC 24 and the #2, #3 MCC 26 is feedback-controlled according to information supplied by the front A/F sensors 21a and 21b, and the exhaust A/F of exhaust flowing into the UCC 30 is feedback-controlled according to information supplied by the upstream rear A/F sensor 29. Further, it is preferred that in the determination as to whether the catalyst has deteriorated or not, the exhaust A/F of exhaust flowing into the UCC 30 is feedback-controlled according to information supplied by the downstream A/F sensor 31, and the exhaust A/F of exhaust flowing into the #1, #4 MCC 24 and the #2, #3 MCC 26 is feedback-controlled according to information supplied by the middle A/F sensors 25 and 27. This further improves the exhaust emission control performance and makes it possible to determine more accurately whether the catalyst has deteriorated or not.

Further, it is preferred that the determination as to whether the catalyst has deteriorated or not is made only when the UCC 30 is active, so that the UCC 30 can surely purify $NO_x$. In this case, whether the UCC 30 is active or not is determined according to whether or not the temperature of the UCC 30 is equal to or higher than a predetermined temperature (e.g. 300° C.), whether or not the cooling water temperature of the engine 1 is equal to or higher than a predetermined temperature (e.g. 40° C.), or whether or not a predetermined period of time (e.g. 3 minutes) has passed after cold-starting of the engine 1, or according to other conditions.

Further, changes in the output from the middle A/F sensors may be of any kinds insofar as they include changes in amplitude or response delay time.

Further, the determination as to whether the catalyst has deteriorated or not may be made only when the engine 1 is operating in a steady state, for example. In this case, it is possible to surely make the determination as to whether the catalyst has deteriorated or not without affecting the output performance of the engine 1.

Further, although in the above described embodiment, a cylinder injection type spark ignition type 4-cycle 4-cylinder gasoline engine is used as the engine 1, any kinds of engines such as an intake pipe injection type gasoline engine, 2-cycle gasoline engine, and diesel engine may be used as the engine 1 insofar as it is a multiple cylinder engine.

What is claimed is:

1. An exhaust emission control system for a multiple cylinder internal combustion engine, comprising:

a plurality of upstream exhaust passages provided for respective ones of a plurality of cylinders of the internal combustion engine;

a downstream exhaust passage formed by joining said plurality of upstream exhaust passages;

a plurality of upstream catalytic converters disposed in respective ones of said plurality of upstream exhaust passages;

a downstream catalytic converter disposed in said downstream exhaust passage;

at least one upstream exhaust sensor provided for said upstream exhaust passages and positioned downstream of said upstream catalytic converters to detect an exhaust air fuel ratio;

an exhaust air-fuel ratio changing device that switches an exhaust air-fuel ratio of exhaust gas flowing into one of said plurality of upstream exhaust passages and an exhaust air-fuel ratio of exhaust gas flowing into another one of said plurality of upstream exhaust passages to a rich air-fuel ratio and to a lean air-fuel ratio alternately on a predetermined cycle longer than each of combustion cycles of the internal combustion engine; and a deterioration determination device that determines whether said upstream catalytic converters have deteriorated according to a change in the exhaust air-fuel ratio detected by said upstream exhaust sensor.

2. An exhaust emission control system for a multiple cylinder internal combustion engine according to claim 1, wherein the predetermined cycle is longer than each of the combustion cycles of the internal combustion engine.

3. An exhaust emission control system for a multiple cylinder internal combustion engine according to claim 1, wherein said plurality of upstream exhaust passages are constructed such that exhaust gas from cylinders where combustion is not continuous are joined together.

4. An exhaust emission control system for a multiple cylinder internal combustion engine according to claim 1, wherein a plurality of upstream exhaust sensors are provided and disposed separately in respective ones of said plurality of upstream exhaust passages, and said deterioration determination device determines whether each of said plurality of upstream catalytic converters has deteriorated according to a change in the exhaust air-fuel ratio detected by said plurality of upstream exhaust sensors.

5. An exhaust emission control system for a multiple cylinder internal combustion engine according to claim 1, wherein the change in the exhaust air-fuel ratio detected by said upstream exhaust sensor is a change with elapse of time in amplitude of output oscillation caused by switching of the exhaust air-fuel ratio by said exhaust air-fuel ratio changing device.

6. An exhaust emission control system for a multiple cylinder internal combustion engine according to claim 1, wherein the change in the exhaust air-fuel ratio detected by said upstream exhaust sensor is a change with elapse of time in response delay time of output oscillation caused by switching of the exhaust air-fuel ratio by said exhaust air-fuel ratio changing device.

7. An exhaust emission control system for a multiple cylinder internal combustion engine according to claim 1, further comprising:

a downstream exhaust sensor provided in said downstream exhaust passage and positioned downstream of said downstream catalytic converter to detect an exhaust air-fuel ratio, wherein said deterioration determination device also determines whether said downstream catalytic converter has deteriorated or not according to a change in the exhaust air-fuel ratio detected by said downstream exhaust sensor.

* * * * *